(12) United States Patent
Fournier et al.

(10) Patent No.: US 6,516,606 B2
(45) Date of Patent: Feb. 11, 2003

(54) AEROENGINE NACELLE AFTERBODIES

(75) Inventors: Alain Fournier, Le Plessis Robinson (FR); Bernard Laboure, Velizy (FR)

(73) Assignee: Hurel-Hispano Meudon, Meudon la Foret (FR)

( * ) Notice: Subject to any disclaimer, the term of this patent is extended or adjusted under 35 U.S.C. 154(b) by 0 days.

(21) Appl. No.: 09/906,050

(22) Filed: Jul. 17, 2001

(65) Prior Publication Data

US 2002/0006333 A1 Jan. 17, 2002

(30) Foreign Application Priority Data

Jul. 17, 2000 (FR) .............................. 00 09301

(51) Int. Cl.$^7$ ................................ F02K 3/02
(52) U.S. Cl. ...................... 60/262; 60/798; 244/54; 239/265.11
(58) Field of Search .................. 60/262, 796, 798; 244/54; 239/265.11

(56) References Cited

U.S. PATENT DOCUMENTS

| | | | | |
|---|---|---|---|---|
| 3,347,578 A | * | 10/1967 | Sheehan | .................. 244/54 |
| 4,585,189 A | * | 4/1986 | Buxton | .................. 244/129.4 |
| 5,369,954 A | * | 12/1994 | Stuart | .................. 239/265.17 |
| 5,941,061 A | * | 8/1999 | Sherry et al. | .................. 244/54 |

FOREIGN PATENT DOCUMENTS

FR    86 09838    1/1988

\* cited by examiner

*Primary Examiner*—Ehud Gartenberg
(74) *Attorney, Agent, or Firm*—Young & Thompson

(57) ABSTRACT

The invention discloses an aeroengine nacelle afterbody of the type comprising a common nozzle for exhausting the mixed hot and cold gases originating respectively from the fan duct and from the aeroengine combustion chamber, the said nozzle having a longitudinal axis more or less coincident with the axis of the said engine. The common exhaust nozzle consists of two half-nozzles which are more or less symmetric with respect to a plane containing the said longitudinal axis, the said half-nozzles being, on the one hand, individually hinged via one of their longitudinal edges to a support structure hanging down from the wing structure or from the fuselage of the aircraft and, on the other hand, lockable together along their opposite longitudinal edges.

5 Claims, 4 Drawing Sheets

AEROENGINE NACELLE AFTERBODIES

BACKGROUND OF THE INVENTION

The present invention relates in general to an aeroengine nacelle afterbody of the type comprising a common nozzle for exhausting the mixed hot and cold gases originating respectively from the fan duct and from the aeroengine combustion chamber, the said nozzle having a longitudinal axis more or less coincident with the axis of the said engine.

The invention therefore relates to what is commonly known as an LDMF (or long duct mixed flow) nacelle afterbody.

In known afterbodies of this type, the CNA (common nozzle assembly) is either fixed, via radial arms, to a primary nozzle, itself secured to the turbine housing, or fixed to the downstream end of the thrust reverser fairing which surrounds the compressors/combustion chamber/turbine assembly. In both cases, the CNA is made of a single part, whereas, in general, the fairing in which the aforementioned assembly is included consists of two half-fairings which are, on the one hand, individually hinged to a support structure, and, on the other hand, lockable together opposite the said hinge.

The aforementioned support structure is either the engine strut if the engine is installed in a nacelle under the wing, or a pylon structure, itself mounted on the aft fuselage of the aircraft, if the engine is installed in a lateral nacelle.

Attachment of the CNA poses numerous problems, particularly given the increasingly tight safety standards in case a fan blade should break and become detached. When such an incident (known as "fan blade off") occurs, the fragment of blade which has become detached, on the one hand, strikes the surrounding parts, which entails providing reinforcements capable of preventing it from being able to cut through vital parts of the aircraft and, on the other hand, leads to an imbalance with an out-of-balance effect which causes violent vibration. In this case, it is necessary to shut down the corresponding engine, with the result that the turbine windmills, something which reduces but does not completely eliminate the harmful vibrations.

The problem of attaching the CNA becomes all the greater if there is a desire to install a thrust reverser in this CNA, because of the weight added by the reverser and the particular forces to be transmitted.

SUMMARY OF THE INVENTION

According to a first aspect of the invention, provision is made, in order to reduce the effect of mounting the common nozzle (CNA) with an overhang, for this nozzle to be made in the form of two half-nozzles which are more or less symmetric with respect to a plane containing the said longitudinal axis, the said half-nozzles being, on the one hand, individually hinged via one of their longitudinal edges to the said support structure and, on the other hand, lockable together along their opposite longitudinal edges.

The CNA is furthermore attached to the downstream end of the fairing by collaboration between a part forming a joint, having a V-shaped part, provided in the downstream end of the said fairing and a complementary V-shaped groove formed in the end facing it of the CNA (an assembly known to those skilled in the art by the name of a V-blade/V-groove structure). Such a structure, illustrated for example in FIG. 4 of U.S. Pat. No. 4,998,409 is designed to transmit axial forces and withstand them. Now, if a fan blade breaks and becomes detached, the vibrations cause forces in uncontrolled directions which the V-blade/V-groove structure may have difficulty in withstanding. Admittedly, more sophisticated V-blade/V-groove structures have been developed (for examples ones using 90° dovetail profiles to avoid any rotational movement) but attachment to the downstream end of the fairing remains a problem.

To overcome these drawbacks, according to a second aspect, the invention provides an afterbody of the aforementioned type and in which each half-fairing and each half-nozzle following on one from the other are made as a single piece.

Thus, the CNA is no longer a separate part requiring attachment to a separate afterbody, and it follows that the problems inherent with this attachment are eliminated The union of the fairing and of the CNA into a single assembly formed of two hinged parts, aside from solving the aforementioned problem, presents numerous advantages which are as follows:

- by dispensing with the means of attachment to a separate afterbody, savings are made not only in material and labour, but above all in nacelle weight; now, in aeronautics, any weight saving has an appreciable economic impact during operation;
- by replacing the one-piece CNA by incorporating the CNA into the two-half structure of the fairing, the structure in question is admittedly lengthened but its bulk in terms of cross section is reduced, this making it easier to transport and to handle, the cross-sectional bulk often being more difficult to deal with than the lengthways bulk;
- and, above all, by having a unitary afterbody, there is far greater freedom to choose where a thrust reverser will be mounted: for example, the reverser could be made to act only on the cold flow if the doors are installed in the afterbody upstream of the downstream edge of the turbine or alternatively could be made to act on the mixture of cold and hot flows if it is installed downstream (as seen above, such downstream mounting is difficult to envisage in the case of a separate CNA because of the additional offset weight that the doors and other auxiliary parts of the reverser contribute).

This possibility of installing the thrust reverser in such a way that it acts on the mixture of flows, while keeping a part of CNA structure downstream, in turn, affords a considerable advantage.

When the thrust reverser acts only on the cold flow, there remains, at the time of thrust reversal, a thrust in direct-jet mode, provided by the hot flow, while braking is by means of the reversal of the cold flow. The braking is therefore the result of the difference between the thrust of the hot flow and the thrust-reversal of the cold flow and, to be satisfactory, requires a high, and therefore noisy engine speed.

When the thrust reverser acts both on the cold flow and on the hot flow, the braking ability is better. It is thus possible either, for the same engine speed, to obtain more radical braking or, for the same intensity of braking, to run the engine at a lower speed, therefore with a substantial reduction in the noise.

Now, this question of noise is increasingly penalizing to airlines, in that a certain number of airports have already forbidden the use of thrust reversal beyond a certain time in the evening. It sometimes follows, in the event of a delayed take-off, that it is impossible to resort to thrust reversal, which presents an element of risk. Thrust reversal with a low, therefore acceptable noise level would allow thrust reversal to be used regardless of the time of landing and would free the airlines of this concern and of this risk.

The subject of the invention is therefore a long duct mixed flow nacelle afterbody for an aeroengine comprising an upstream zone and a downstream zone by reference to the direction in which the gases flow, which consists of two parts which are more or less symmetric with respect to a plane containing the longitudinal axis of the aeroengine, the said parts being, on the one hand, individually hinged by one of their longitudinal edges to the said support structure and, on the other hand, lockable together along their opposite longitudinal edges, each of the said parts comprising, from the outside inwards, in the upstream zone, three aerodynamic surfaces, namely a nacelle exterior surface, a cold flow duct exterior surface and a cold flow duct interior surface and, in the downstream zone, two aerodynamic surfaces, namely a nacelle exterior surface and a mixed hot and cold flow surface.

BRIEF DESCRIPTION OF THE DRAWINGS

The invention will be better understood on reading the description given hereinafter with reference to the appended drawings in which.

DETAILED DESCRIPTION

In the description hereinbelow, the same references will be used from one figure to another to denote parts which are identical or similar.

Figure 1:
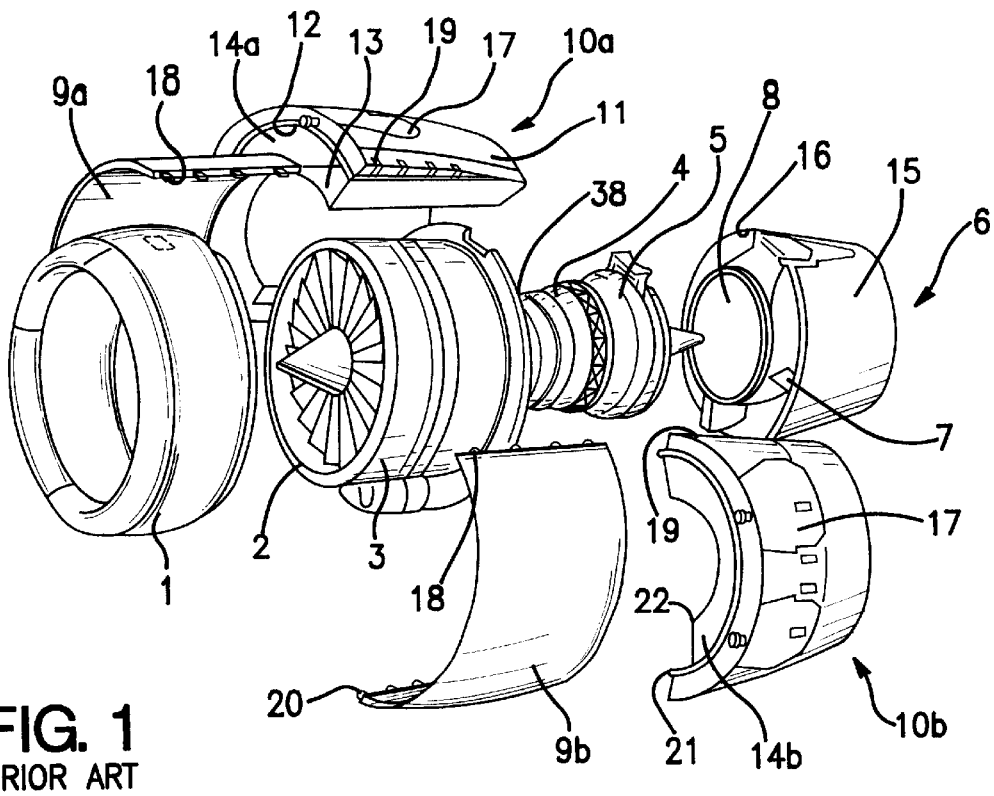
FIG. 1 is an exploded perspective view of the propulsion system of the Rolls Royce Trent 700 engine of the Airbus A330 (nacelle under the wing), illustrating the state of the prior art.

FIG. 1 depicts a propulsion system of the prior art, showing the air intake 1, the fan 2, the fan casing 3, the compressors 38, the combustion chamber 4, the turbine casing 5 and the exhaust nozzle which consists of a primary nozzle 8 (hot gases) and of a secondary nozzle 6 (mixed hot and cold gases). It is this secondary nozzle which is referred to as the "common exhaust nozzle" or CNA in the context of the present description and of the claims. The common exhaust nozzle 6 is mounted by radial arms 7 on the primary nozzle 8, the assembly being fixed to the turbine casing 5.

It is to be noted that these arms are thus secured to the hot parts of the engine and experience undesirable thermal loadings. Furthermore, they give rise to engine performance losses.

The system further comprises an engine cowling made in two parts 9a, 9b and a thrust reverser fairing made in two parts 10a, 10b designed to surround the assembly formed by the compressors 38, the combustion chamber 4 and the turbine casing 5, the split of the engine cowling and of the thrust reverser fairing into two parts being along a more or less vertical plane of section. Each thrust reverser half-fairing 10a, 10b has three aerodynamic surfaces or skins, namely a nacelle exterior surface 11, a fan duct exterior surface 12 and a fan duct interior surface 13. The surfaces 12 and 13 delimit a fan half-duct (cold flow) 14a and 14b respectively. For its part the CNA 6 has two aerodynamic surfaces, namely the nacelle exterior surface 15 and the mixed hot and cold flows duct interior surface 16. Thrust reverser doors 17 are installed in the fairing 10a, b, to act on the cold flow.

In this prior-art system, the engine cowling and the thrust reverser fairing are each formed of two halves, 9a, 9b and 10a, 10b, respectively, but the common nozzle or CNA 6 is made as a single part. The two half-cowlings 9a, 9b and the half-fairings 10a, 10b are mounted hinged to the engine beam (not depicted) by means of hinges, 18 and 19 respectively. On the opposite side to the hinges, the half-cowlings 9a, 9b and the half-fairings 10a, 10b have latches such as 20 allowing them to be latched in the closed position. Of course, the purpose of this hinged two-part assembly is to allow easier access to the hot parts of the aeroengine.

The thrust reverser fairing 10a, b is secured to the engine by means of V-blade/V-groove structures whose position on the upstream end of the half-fairing 10b is indicated as 21, for connection to the fan outer casing 3, and optionally as 22, for connection to an engine internal casing. Complementary structures are positioned opposite on the said casings.

It will be understood, according to the prior art, that the CNA 6 is mounted with an overhang on the turbine casing 5.

Figure 2:
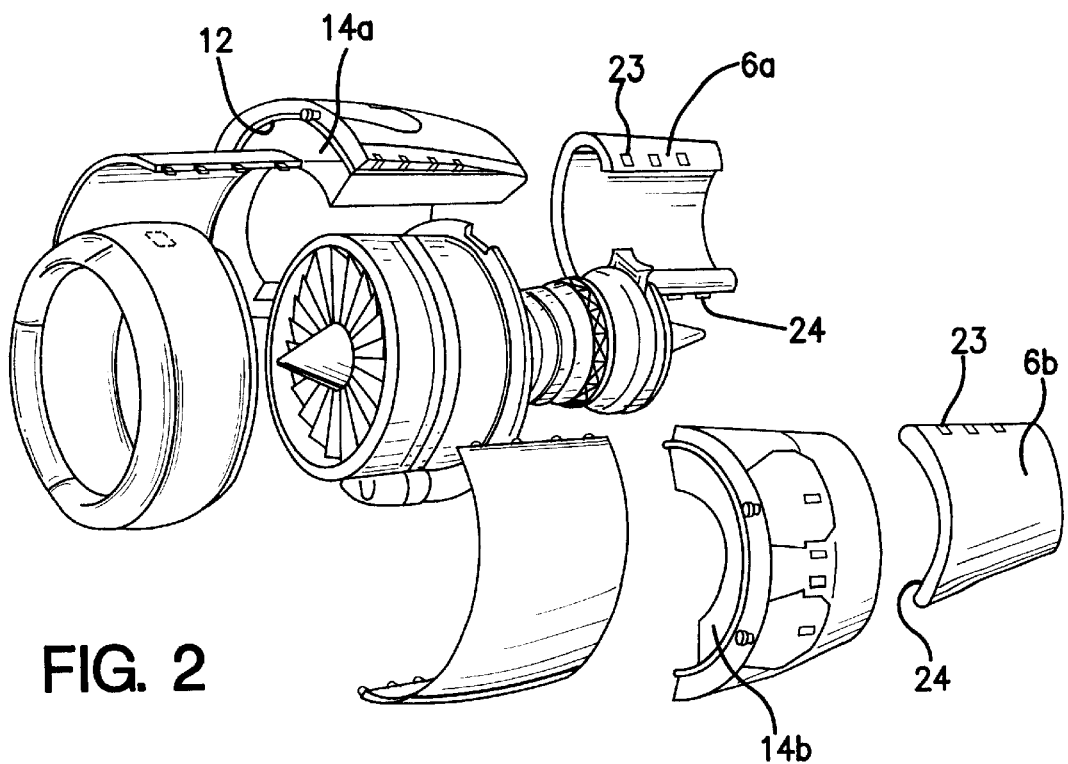
FIG. 2 is a view similar to that of FIG. 1, modified by the incorporation of a first embodiment of the present invention (nacelle under the wing)

A first modification, according to the invention, of this known structure consists in producing the CNA, like the engine cowling 9a, b and the thrust reverser fairing 10a, b, that is to say in two parts 6a and 6b as shown in FIG. 2 where the primary nozzle 8 has been omitted in order not to complicate the drawing. These half-CNAs are mounted so as to be hinged, for example by means of three hinges 23 installed in the 12 o'clock position on the engine beam, and are equipped with the same number of latches 24 installed in the 6 o'clock position and allowing the CNA to be closed up. In this way, the CNA 6 is not only held by its upstream end, but is also held along two of its generatrices.

As the CNA is no longer mounted with an overhang, it is possible for the location at which the thrust reverser is installed to be modified, that is to say to leave the fairing 10a, 10b alone and to install the thrust reverser in the CNA.

The half-CNAs 6a, 6b are connected by a V-blade/V-groove system to the exterior skin 12 of the fan half-ducts 14a, b so as to provide sealing and so as to transmit the axial forces.

In a preferred embodiment of the invention, however, the modification is not limited to splitting the CNA into two hinged halves but to combining each half-fairing 10a or 10b and the half-CNA 6a or 6b which follows on from it into a single piece.

Figure 3A:
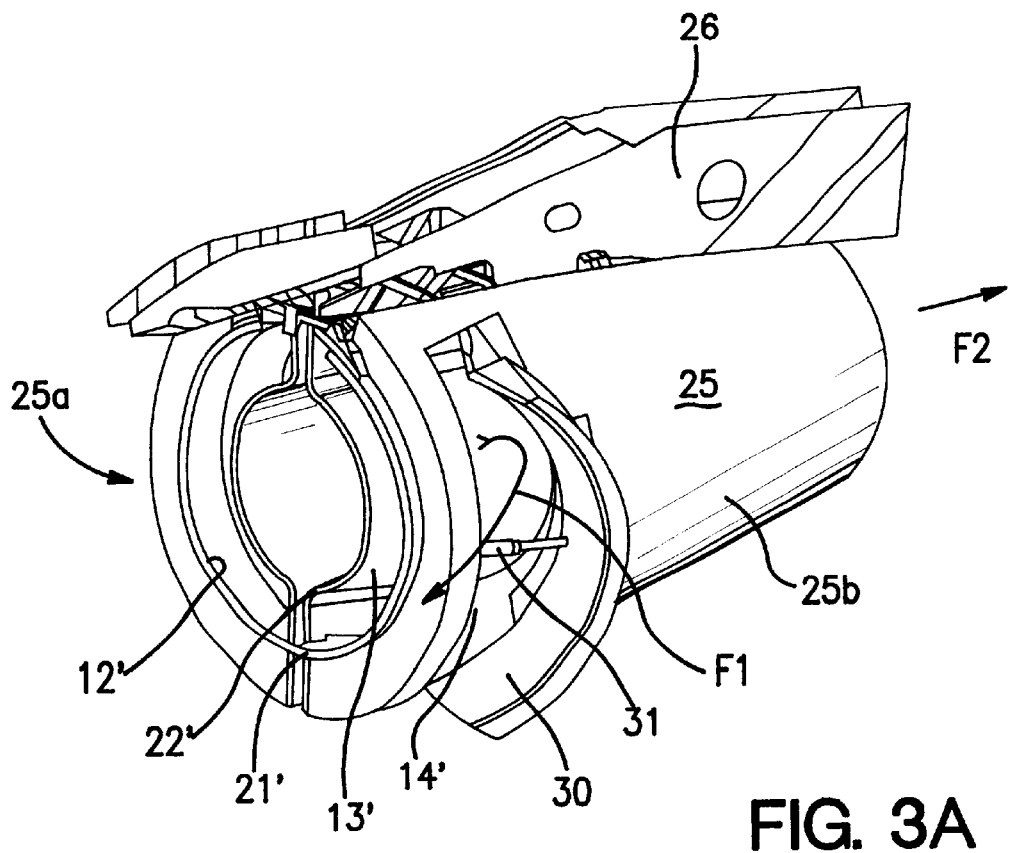
FIGS. 3a and 3b are perspective views of a second embodiment of the present invention incorporated into an under-wing nacelle, with a thrust reverser with two doors which are respectively deployed and stowed, and which act on the cold flow.
Figure 3B:
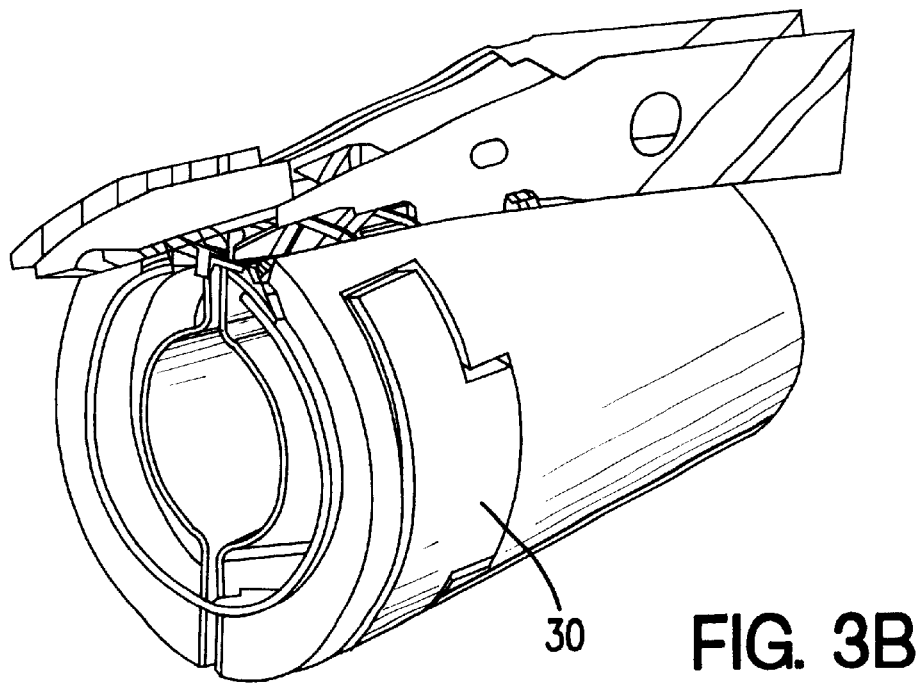

Thus, if reference is made to FIGS. 3a and 3b, there can be seen a unitary fairing or afterbody 25, the upstream part of which forms the fairing of the compressors/combustion chamber/turbine assembly and the downstream part of which forms the CNA. The unitary afterbody 25 is formed of two halves 25a, 25b which are more or less symmetric with respect to a more or less vertical plane of section and which are mounted so as to be hinged by means of hinges to the engine strut 26 and lockable in the closed position by means of latches mounted opposite the hinges. Depending on the dimensions and other characteristics of the engine, from four to eight hinge points will be provided in the 12 o'clock position and from four to eight latches will be provided in the 6 o'clock position.

The unitary afterbody is secured to the fan casing 3 by means of V-blade/V-groove structures, whose position on the upstream end of the half-fairing 10*b* is indicated at 21' for connection to the fan outer casing 3 and optionally at 22' for connection to an engine inner casing. Complementary structures are positioned facing them on the said casings.

As can be seen, the unitary afterbody 25 defines, between its skins 12' and 13', the fan duct or cold flow duct 14'. It will be understood that the fan duct 14' is in fact made up of two fan half-ducts. In the upstream part of the unitary afterbody 25 are mounted two pivoting thrust reverser doors 30, capable, under the effect of a ram 31, of moving from a stowed position in which they complete the wall of the fairing (FIG. 3*b*) into a deployed position in which they block practically the entirety of the cold flow duct (FIG. 3*a*) and deflect this cold flow upstream, in the direction of the arrow F1, the hot flow continuing to be ejected in the direction of the arrow F2.

Instead of a two-door thrust reverser as depicted, for example a PAPILLON (trade name of the assignee company) thrust reverser as described and claimed in French patent no. 95/06561 by the assignee company, it would be possible, as an alternative, to install a four-door thrust reverser (of the "petal" type) as described and claimed in French patent no. 81/10693 by the assignee company, and depicted in FIG. 1.

Figure 4A:
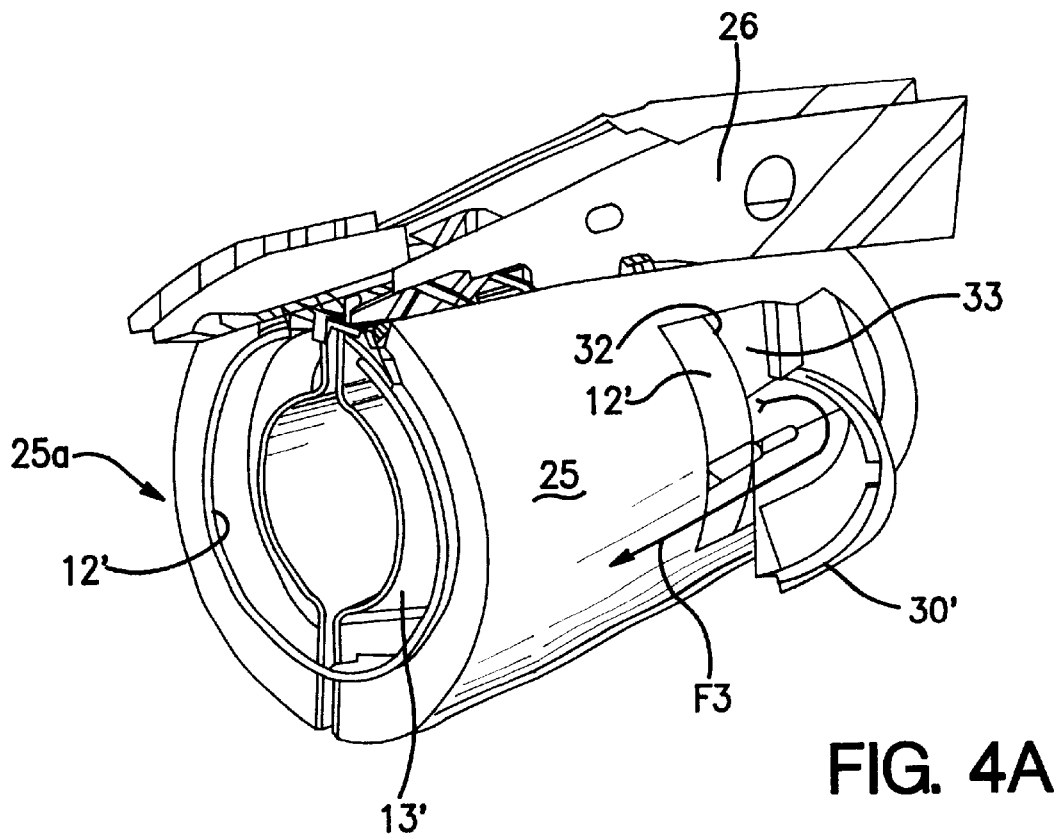
FIGS. 4a and 4b are perspective views of a third embodiment of the present invention incorporated into an under-wing nacelle, with a "upstream" two-door thrust reverser which are respectively deployed and stowed, and which act on the mixture of cold and hot flows.
Figure 4B:
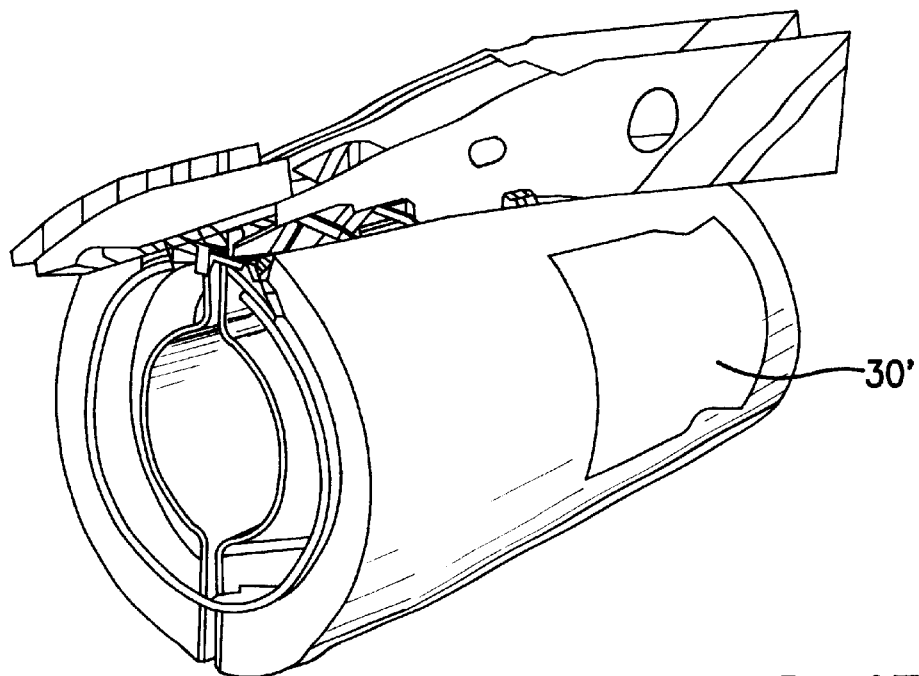

The embodiment in FIGS. 4*a* and 4*b* differs from that in FIGS. 3*a* and 3*b* only in the installation of the thrust reverser doors. Aside from the components already identified with reference to the previous Figures, we can here see the downstream end 32 of the skin 12' and the mixed hot and cold flow duct 33 downstream of this downstream end. This time, the zone in which the thrust reverser doors 30' are installed is such that in the deployed position they block the mixed flow duct 33 so that, give or take leakage (which may, incidentally, be deliberately introduced), all the thrust is reversed in the direction of the arrow F3. The doors 30' may, for example, as depicted in the figure, belong to an "upstream" two-door thrust reverser as described and depicted in French patent no. 86/09838 by the assignee company, or a PERT (trade name of the assignee company) thrust reverser as described and claimed in French patent No. 97/06780, also in the name of the assignee company.

Figure 5:
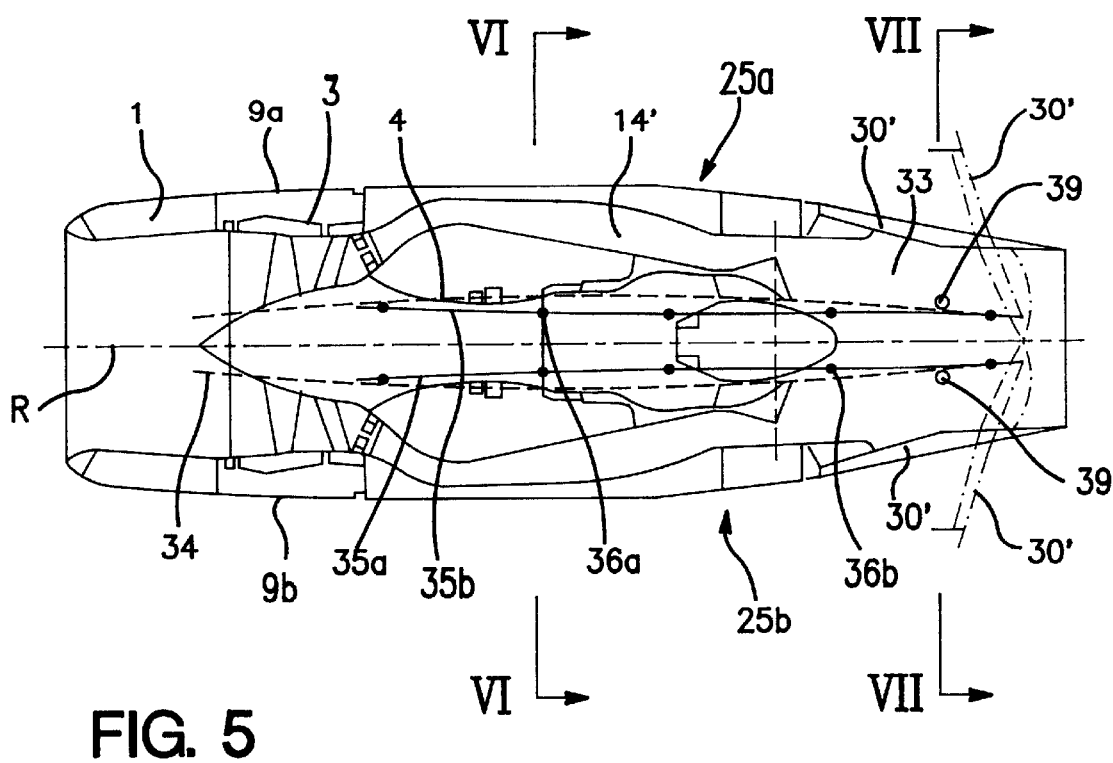
FIG. 5 is a view in longitudinal section of lateral nacelle according to a fourth embodiment.
Figures 6, 7:
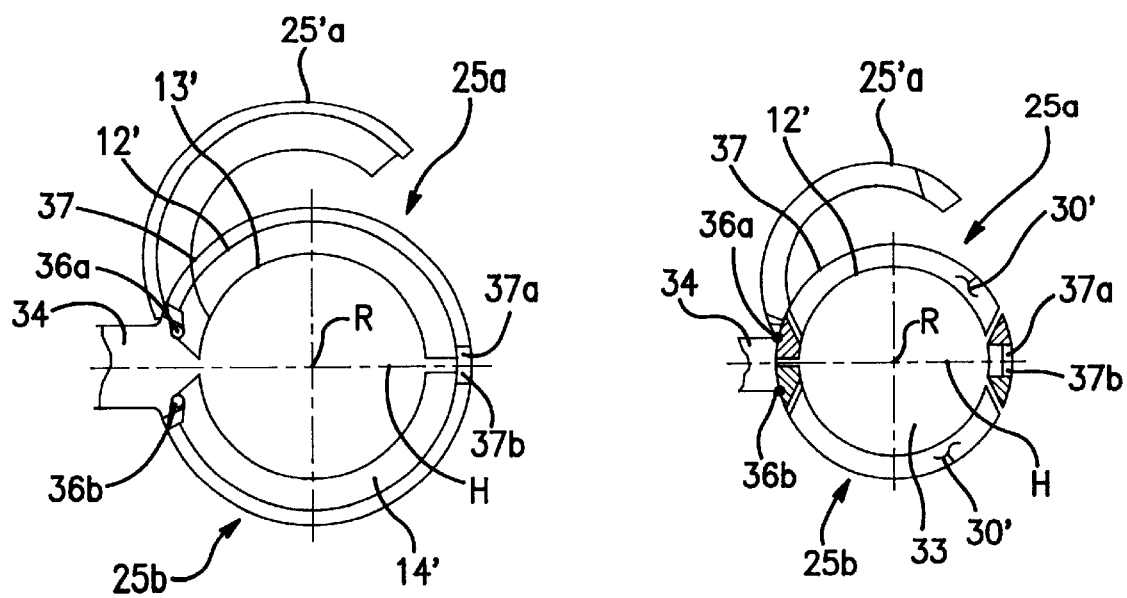
FIGS. 6 and 7 are respectively sections taken on the lines VI—VI and VII—VII of FIG. 5.

FIGS. 5, 6 and 7 show a fourth embodiment applied in the case of an engine installed in a lateral nacelle.

In this case, the plane dividing the unitary afterbody into two more or less symmetric parts is a more or less horizontal plane.

In the section of FIG. 5, the same elements can be found as were found in the perspective view of FIGS. 4*a* and 4*b*, the thrust reverser once again being installed in such a way that it acts on the mixed flow. The doors 30' are depicted in solid line in the stowed position and in dotted line in the deployed position. The pivot axes of the two doors 30' can be seen at 39. The thrust reverser may, as before, be of the "upstream" two-door type, or be a PERT thrust reverser.

The benefit of FIGS. 5 to 7 is that they more clearly show the location of the hinges and that the number of skins changes from three to two, from upstream to downstream, in the unitary afterbody.

As can be seen in FIGS. 5 to 7, the nacelle is mounted on a pylon 34 secured to the aft fuselage of the aircraft. Two axes of articulation 35*a* and 35*b* are defined on this pylon and two series of hinges 36*a*, 36*b* are aligned along these (there being five pairs of hinges in the embodiment illustrated). These hinges are situated on each side of a more or less horizontal plane H which contains the axis R of the aeroengine. On the opposite side to the hinges, the two unitary afterbody halves 25*a*, *b* have latches 37*a*, 37*b* for closing off the said afterbody. In FIGS. 6 and 7, the upper half 25*a* of the afterbody is depicted open in fine line at 25*a'*. The thrust reverser doors 30' are shown in the section of FIG. 7.

As can be seen, in the section on the line VI—VI of FIG. 5 (FIG. 6), the unitary afterbody 25 comprises, from the outside inwards, the nacelle surface 37, the exterior surface 12' of the fan duct and the interior surface 13' of the fan duct, whereas in the section on the line VII—VII of FIG. 5 (FIG. 7) there remain only the surfaces 37 and 12'.

The unitary afterbody 25*a*, *b* therefore changes from what is commonly known as a two half-duct "D-duct" configuration to a two half-duct "C-duct" configuration. It is therefore of the "D/C-duct" type.

It is to be clearly understood that, as in the case of the underwing nacelle afterbody illustrated in FIGS. 3*a* and 3*b*, the thrust reverser could be installed in the unitary afterbody of the lateral nacelle at a location such that it acts on the cold flow only.

Although, in the embodiments described and depicted hereinabove, the unitary afterbody always comprises a thrust reverser, the invention also covers cases where no thrust reverser is installed in the said afterbody: this is because it is conceivable, in particular, for an aircraft to be equipped with four underwing nacelles, two on each side of the fuselage, and only the inboard nacelles of which are to be fitted with thrust reversers.

What we claim is:

1. An aeroengine nacelle afterbody of the type comprising a common nozzle for exhausting the mixed hot and cold gases originating respectively from the fan duct and from the aeroengine combustion chamber, the said nozzle having a longitudinal axis more or less coincident with the axis of the said engine, wherein the common exhaust nozzle consists of two half-nozzles which are more or less symmetric with respect to a plane containing the said longitudinal axis, the said half-nozzles being, on the one hand, individually hinged via one of their longitudinal edges to a support structure hanging down from the wing structure or from the fuselage of the aircraft and, on the other hand, lockable together along their opposite longitudinal edges.

2. An afterbody according to claim 1, in which the fan duct is made up of two fan half-ducts, each of which is defined between an exterior skin and an interior skin belonging to a half-fairing, the two half-fairings being more or less symmetric with respect to a plane containing the said longitudinal axis, and being, on the one hand, individually hinged via one of their longitudinal edges to the said support structure and, on the other hand, lockable together along their opposite longitudinal edges, wherein each half-fairing and each half-nozzle following on one from the other are made as a single piece.

3. An Afterbody according to claim 2, wherein it delimits both a duct for cold gases and a duct for mixed hot and cold gases, and in that it further comprises a door-type thrust reverser situated in such a location that, in the deployed position, the doors block only the flow of the cold gases.

4. An afterbody according to claim 2, wherein it delimits both a duct for cold gases and a duct for mixed hot and cold gases, and in that it further comprises a door-type thrust reverser situated in such a location that, in the deployed position, the doors block the flow of the mixed hot and cold gases.

5. A long duct mixed flow nacelle afterbody for an aeroengine comprising an upstream zone and a downstream zone by reference to the direction in which the gases flow, wherein it consists of two parts which are more or less symmetric with respect to a plane containing the longitudinal axis of the aeroengine, the said parts being, on the one hand, individually hinged by one of their longitudinal edges to a support structure hanging down from the wing structure or from the fuselage of the aircraft and, on the other hand, lockable together along their opposite longitudinal edges, each of the said parts comprising, from the outside inwards, in the upstream zone, three aerodynamic surfaces, namely a nacelle exterior surface, a cold flow duct exterior surface and a cold flow duct interior surface and, in the downstream zone, two aerodynamic surfaces, namely a nacelle exterior surface and a mixed hot and cold flow surface.

* * * * *